(12) United States Patent
Shahrbabaki et al.

(10) Patent No.: US 7,181,698 B2
(45) Date of Patent: Feb. 20, 2007

(54) DETACHABLE TABS PRESENTING ACCESSED OBJECTS IN A MULTI-TAB INTERFACE

(75) Inventors: Khatoun Shahrbabaki, Leimen (DE); Christof Helfrich, Sandhausen (DE)

(73) Assignee: SAP AG, Walldorf (DE)

( * ) Notice: Subject to any disclaimer, the term of this patent is extended or adjusted under 35 U.S.C. 154(b) by 816 days.

(21) Appl. No.: 10/321,295

(22) Filed: Dec. 16, 2002

(65) Prior Publication Data

US 2004/0113948 A1 Jun. 17, 2004

(51) Int. Cl.
G06F 15/00 (2006.01)
G06F 13/00 (2006.01)
(52) U.S. Cl. ..................................... 715/790; 715/798
(58) Field of Classification Search ................ 715/763, 715/764, 765, 790, 798, 802, 804, 842, 777
See application file for complete search history.

(56) References Cited

U.S. PATENT DOCUMENTS

| | | | |
|---|---|---|---|
| 5,546,528 A | 8/1996 | Johnston | |
| 5,808,610 A | 9/1998 | Benson et al. | |
| 5,870,091 A | 2/1999 | Lazarony, Jr. et al. | |
| 6,043,816 A * | 3/2000 | Williams et al. ............ | 715/783 |
| 6,651,216 B1 * | 11/2003 | Sullivan et al. ............ | 715/503 |

OTHER PUBLICATIONS

Microsoft.com web site, *Building Multiple Document Interface (MDI) Applications with WFC*, Mar. 3, 1999.
TheBrain Technologies Corporation, *Personal Brain User Guide*, Sep. 17, 2001.
Microsoft.com web site, *Multiple-Document Interface (MDI) Applications*, 2002.

* cited by examiner

*Primary Examiner*—Cao (Kevin) Nguyen
(74) *Attorney, Agent, or Firm*—Mintz, Levin, Cohn, Ferris, Glovsky & Popeo, P.C.

(57) ABSTRACT

Systems and techniques to detach and reattach tabs presenting accessed objects in a multi-tab interface for a software application. In general, in one implementation, the system includes a windowed environment, and an application using the windowed environment and employing an application navigation structure. The application navigation structure includes a multi-tab user interface to objects handled by the application. The multi-tab user interface includes a tab-strip presenting opened objects in tabs including a detach interface element that causes a tab presenting an opened object to be transferred from the multi-tab user interface to a window in a multi-window user interface. The window includes an attach interface element that causes the window presenting the opened object to be transferred from the multi-window user interface to the multi-tab user interface.

29 Claims, 4 Drawing Sheets

DETACHABLE TABS PRESENTING ACCESSED OBJECTS IN A MULTI-TAB INTERFACE

BACKGROUND

The following description relates to graphical user interface (GUI) technology, for example, a windowing interface used to interact with various data objects.

Over the years computers have become increasing more complex, supporting multiple software applications with complex functionality. These software applications often have sophisticated, windowed graphical user interfaces with containing tools, information, and displays for manipulating objects. The GUI window can contain menu bars, with pull-down menus, toolbars, and controls. Controls are graphical elements of a GUI that provide a structure for the user interface. Traditional controls include labels, push buttons, radio buttons, icons, group boxes, and tab-strips. A tab-strip is a container that includes several tabs, which can each present information, although only one tab is visible at a time.

Traditionally, there are many ways to structure an application interface in a windowed environment, but three basic approaches are common. These application interface structures typically correspond to a navigation concept, because the interface structure allows the user to navigate among the functionality and objects of the application. In general, simple and intuitive navigation concepts are better for making a GUI interface structure easy to use.

One common application navigation structure is a multi-window interface. A multi-window application can have multiple main windows, each of which can launch other nonmodal or modal windows. A modal window corresponds to a modal state of the application and thus provides limited functionality. A nonmodal window is not limited to a particular modal state, and thus a nonmodal window typically includes a menu bar that provides access to the application's full range of functions.

Traditional modal windows have included tab-strips. For example, one kind of modal window is a palette, which is a small parallel window without a menu that presents application functionality using a tab-strip. A palette typically cannot be manually resized by the user. Such palette-based tabs can be removed from a palette and given their own palette and/or combined with other tabs in another palette by clicking and dragging. Some palettes include functions allowing the tabs to be stacked and minimized within a single palette to reduce the amount of clutter from having many opened palettes on a display at one time.

All the windows in a multi-window interface are parallel windows. Thus, all the windows can be moved independently of each other. A multi-window interface structure allows the user to decide how much display area to devote to each window, and the user can open and work with the different main windows in any order.

Another common application navigation structure is the Multiple Document Interface (MDI) provided by Microsoft Corporation of Redmond, Wash. An MDI application has only one main window that displays a main menu. Application objects can be opened in child windows. A child window can be moved and resized only within the main window, and the child window typically does not include pull-down menus.

Another common application navigation structure is the multi-tab interface. A multi-tab application has one main window that displays a main menu. Application objects can be opened in a tab-strip. The tab-strip clusters the tabs, which present the opened objects. The tab-strip allows the user to switch between several objects by clicking the tabs. The objects appear to share the same space on the screen, and only one tab is visible at a time. Traditional Hypertext Markup Language (HTML) development tools provide a multi-tab interface to serve as an object-editor.

Some conventional windowing interfaces also allow windows to be docked to each other, such that docked windows move together. Moreover, some conventional windowing interfaces allow predefined interface portions of a current window, which are accessible through push buttons on a toolbar, to be removed and placed in a new window in response to selection of a detach button, such as in BrainEKP™, provided by TheBrain Technologies Corporation of Santa Monica, Calif.

SUMMARY

The present disclosure includes systems and techniques relating to detaching and reattaching tabs presenting accessed objects in a multi-tab interface for a software application, such as a development tool. According to an aspect, a system includes a windowed environment, and an application using the windowed environment and employing an application navigation structure. The application navigation structure includes a multi-tab user interface to objects handled by the application. The multi-tab user interface includes a tab-strip presenting opened objects in tabs including a detach interface element that causes a tab presenting an opened object to be transferred from the multi-tab user interface to a window in a multi-window user interface. The window includes an attach interface element that causes the window presenting the opened object to be transferred from the multi-window user interface to the multi-tab user interface. The resulting combined user interface can be understood as a multitab-window user interface.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to a graphical user interface (GUI) in a windowed environment (e.g., a window-based operating system). As used herein, the term "window" refers to a GUI element that presents information in a defined region of a display. A window can be positioned on a display independently of other windows, unless the window is a child window of a parent window, as in an MDI environment, in which case the child window is confined to the area of the parent window. A window may include a title bar, a menu bar, and/or a toolbar, and a window may be resizable. The term "panel" refers to a defined GUI container of information having a defined area within a window. A tab-strip control presents information in a panel of a window using tabs with tab-heads in a tab-strip border or navigation bar; a visible tab-head can be selected to make a hidden tab appear in the panel.

Figure 1:
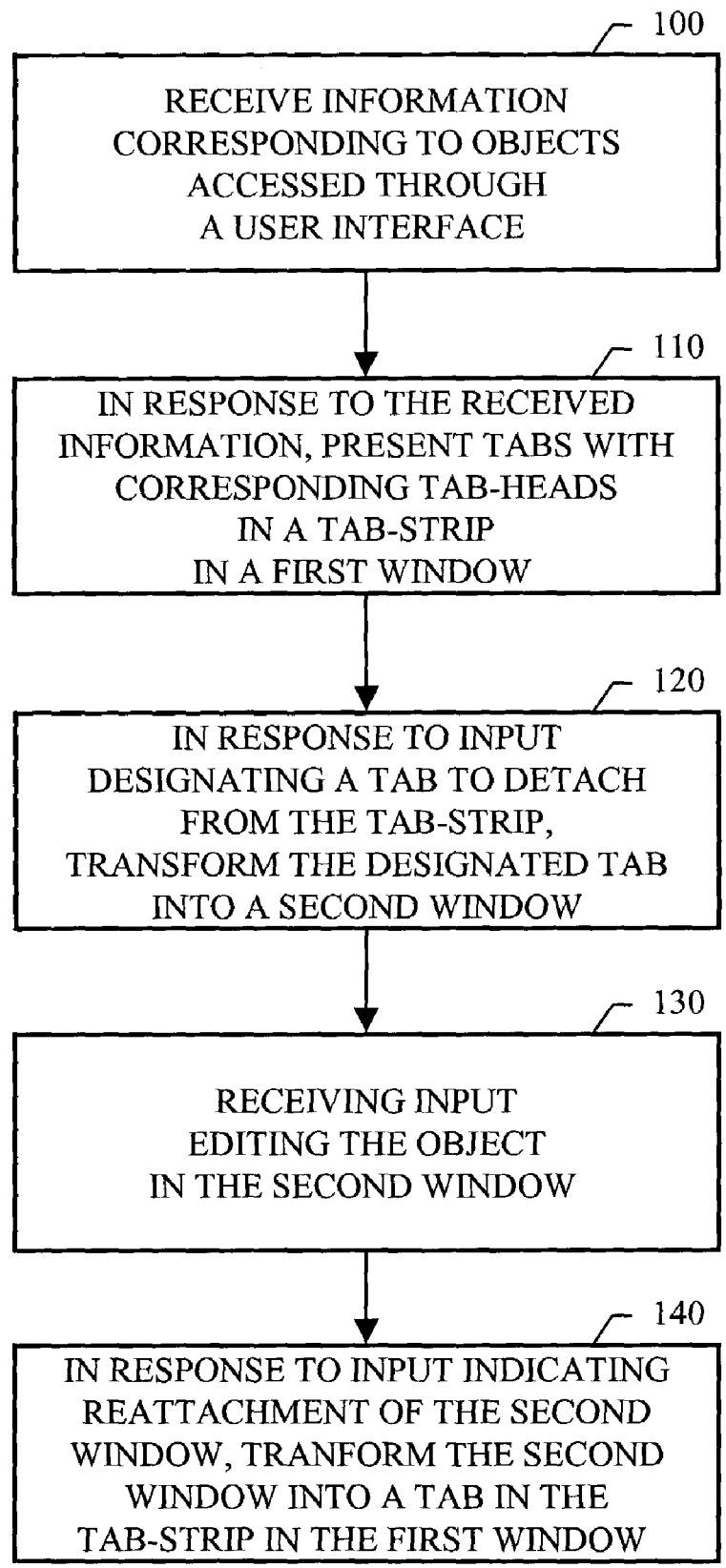
FIG. 1 illustrates a process implementing an example multitab-window user interface.

FIG. 1 illustrates a process implementing an example multitab-window user interface. Information corresponding to objects accessed through a user interface is received at 100. The objects can be development tool objects or other objects that can be handled by an application presenting the user interface in a windowed environment. In response to the received information, tabs with corresponding tab-heads in a tab-strip are presented in a first window at 110. The tabs in the tab-strip correspond to the accessed objects. For example, the tabs can be object editor tabs for opened objects. The tab-heads can correspond to the received information. For example, the tab-heads can include names of the accessed objects, and the tab-heads can be presented in an order that corresponds to an order in which the user accessed the objects.

Presenting the tabs can involve presenting a detach interface element (e.g., a button) in connection with the tabs to obtain input designating a tab to detach. In response to input designating a tab to detach from the tab-strip, the designated tab is transformed into a second window at 120. The second window presents object information previously presented in the designated tab, and the second window can be a non-modal window, which can include a menu bar and a toolbar. The menu bar and toolbar can provide all needed functions for the object in the second window. For example, the designated tab can include a tab menu, and the second window can include a menu bar that collect the tab menu and a menu from the first window, such as an editmenu from a main window.

Transforming the designated tab into the second window can involve presenting the second window above the first window in a user-specified location to facilitate side-by-side object comparison. Transforming the designated tab into the second window can also involve retaining a functional connection between the second window and a navigation element in the first window. The navigation element can be a tab-head corresponding to the designated tab, and retaining a functional connection can involve retaining the corresponding tab-head in the tab-strip such that selection of the corresponding tab-head in the tab-strip activates the second window.

The navigation element can also be navigation buttons, tab arrows, and/or a tab index interface, and retaining a functional connection can involve retaining the second window in a tab navigation history such that selection of the navigation element(s) activates the second window. The navigation buttons can be forward and backward buttons placed in the toolbar of the first window. The various navigation element(s) can provide navigation functions among presented object interface elements, including the second window and the tabs presented in the first window. The navigation element(s) can be used to raise tabs to the fore in the tab-strip and/or to activate the second window, including opening the second window if it has been minimized or bringing the second window into the foreground if it has been hidden. Moreover, the navigation element(s) can be collected in a navigation bar, which may itself be detached.

The second window can provide an editing interface for an object, and transforming the designated tab into the second window can involve presenting a reattach interface element in connection with the second window to obtain input indicating reattachment. Input editing the object in the second window can be received at 130. Then, in response to input indicating reattachment of the second window, the second window can be transformed into a tab in the tab-strip in the first window at 140. The, second window is thus eliminated.

Figure 2:
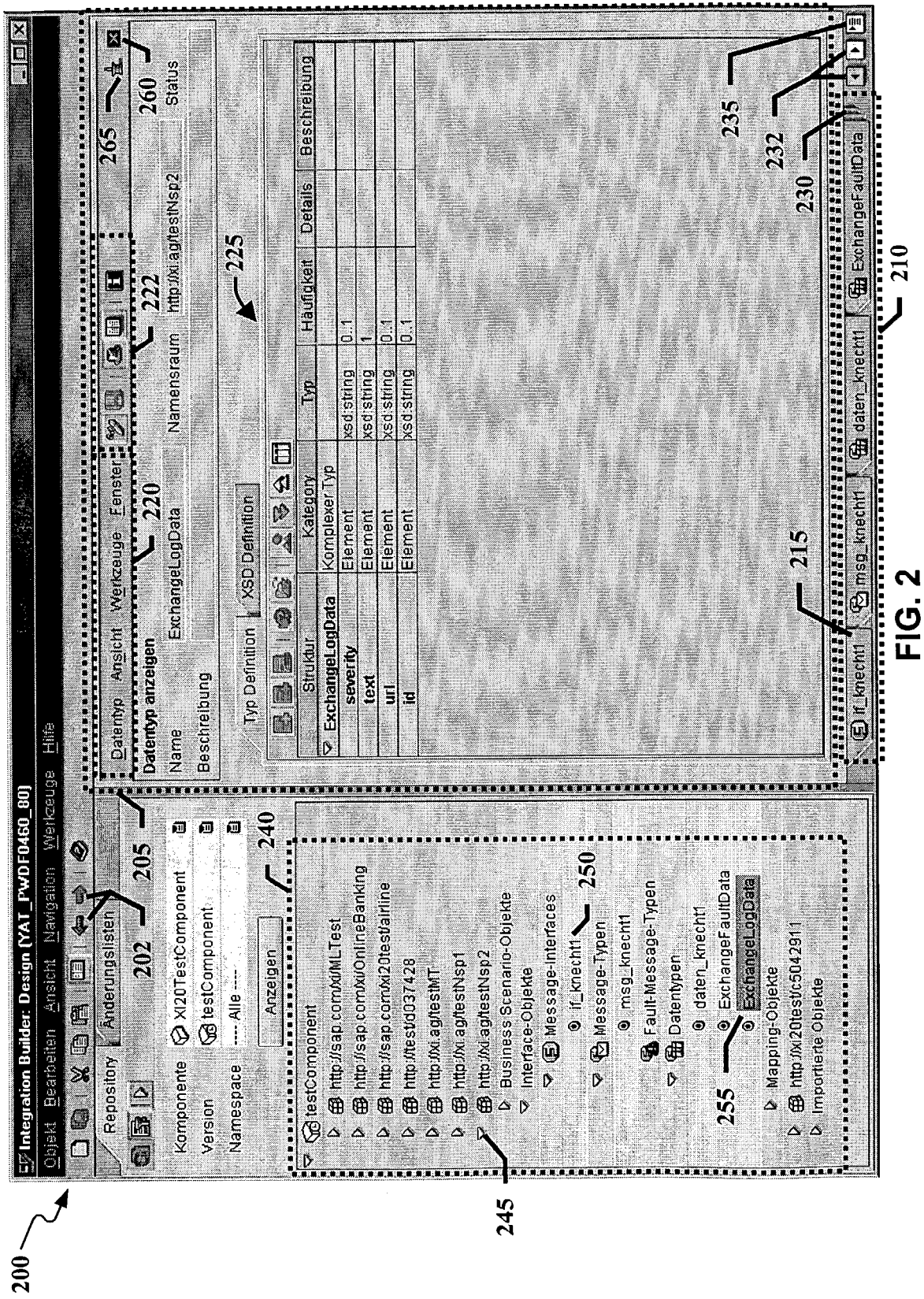
FIG. 2 shows an example multitab-window user interface with detachable tabs.

FIG. 2 shows an example multitab-window user interface with detachable tabs. A main window 200 includes multiple panels, one of which provides a tab-strip control. The tab-strip includes a currently visible tab 205 and several hidden tabs, with tab-heads shown in a tab-strip border 210, such as a tab-head 215. The tab-heads in the tab-strip border 210 correspond to tabs in the panel of the window 200 such that selecting a tab-head causes the corresponding tab to be brought forward, displaying the tab's content in the panel and hiding the previously displayed tab. A tab can be an object editor tab, providing an editing interface for objects in a development tool. A tab can include a tab menu 220 and a toolbar 222, which may be used to edit the object. A tab can include its own tab-strip control 225 with sub-tabs.

When a tab-head in the tab-strip border 210 is selected to bring forward the corresponding tab, the selected tab-head may disappear from the tab-strip border 210; thus, the currently displayed tab does not have a corresponding tab-head in the tab-strip border 210. Alternatively, the selected tab-head can remain in the tab-strip border 210 when selected to bring forward the corresponding tab.

A user may navigate among multiple objects to be displayed using a user interface. Such objects can be documents, data objects, and/or software objects in a development tool, such as a software/interface development tool. As the user navigates among the multiple objects and accesses the tabs corresponding to the objects, each viewed tab can be added to a history list and a corresponding tab-head can be presented in a tab-strip border. Thus, the tab-strip border becomes a history of viewed objects. As shown in the tab-strip border 210, only a recent subset of this navigation history is displayed.

Additionally, the navigation history can be made available through partially hidden tab-heads 230, tab arrows 232, and/or a tab index button 235, which is discussed further below. The tab-strip border 210, the tab arrows 232 and the tab index button 235 can be part of a single navigation bar. The navigation bar can be oriented horizontally or vertically, and the navigation bar can be detached from the main window 200 as well. Moreover, the tab-heads can be stacked in rows or columns.

The user interface used to navigate among the multiple objects to be displayed can include the tabs themselves. For example, a selected tab may include links to other objects. Clicking on such a link can cause a new tab for the other object to be opened. Thus, the navigation can occur entirely within the tab-strip control itself.

Moreover, selecting the tab-heads in the tab-strip border can also be a navigation activity. In this case, selecting a tab-head modifies the history represented in the tab-strip border, such as by moving the selected tab to the top of the history list and repositioning the selected tab-head in the tab-strip border. Alternatively, selecting the tab-heads in the tab-strip border can be considered a non-navigation activity and not result in a change to the history list. Thus, selecting the tab-heads in the tab-strip border can cause movement backward and forward in the history of viewed tabs such as with backward and forward buttons in a Web browser. The window 200 can also include backward and forward navigation buttons 202 with similar functionality.

The user interface used to navigate among the multiple objects to be displayed can include a main menu, a toolbar, and/or other interface elements in the window 200. The navigation information can relate to objects to be edited in a development tool. For example, the window 200 can include a panel with a navigation tree control 240. The navigation tree control 240 provides access to objects according to a hierarchical representation of those objects, such as a file structure or an object organization structure in the development tool. Portions of the navigation tree control 240 can be expanded or contracted using tree interface elements, such as a twisty icon 245.

The objects listed in the navigation tree 240 can be accessed by selecting those objects directly. For example, double clicking on a listed item 250, labeled "if_knecht1", causes a corresponding object editor tab to open. Subsequently double clicking on another listed item 255, labeled "ExchangeLogData", causes a corresponding object editor tab to open as shown. The previously viewed tab gets a tab-head 215 that corresponds to the listed item 250. Thus, the user can then redisplay the previously viewed tab either by selecting the tab-head 215 or by selecting the listed item 250.

A currently displayed tab can be closed by selecting a close icon 260. The currently displayed tab can also be detached from the window 200 and transformed into a new window by selecting a detach button 265, which displays an upward-pointing pushpin. The pushpin pointing up indicates a detach action for the attached tab.

Figure 3:
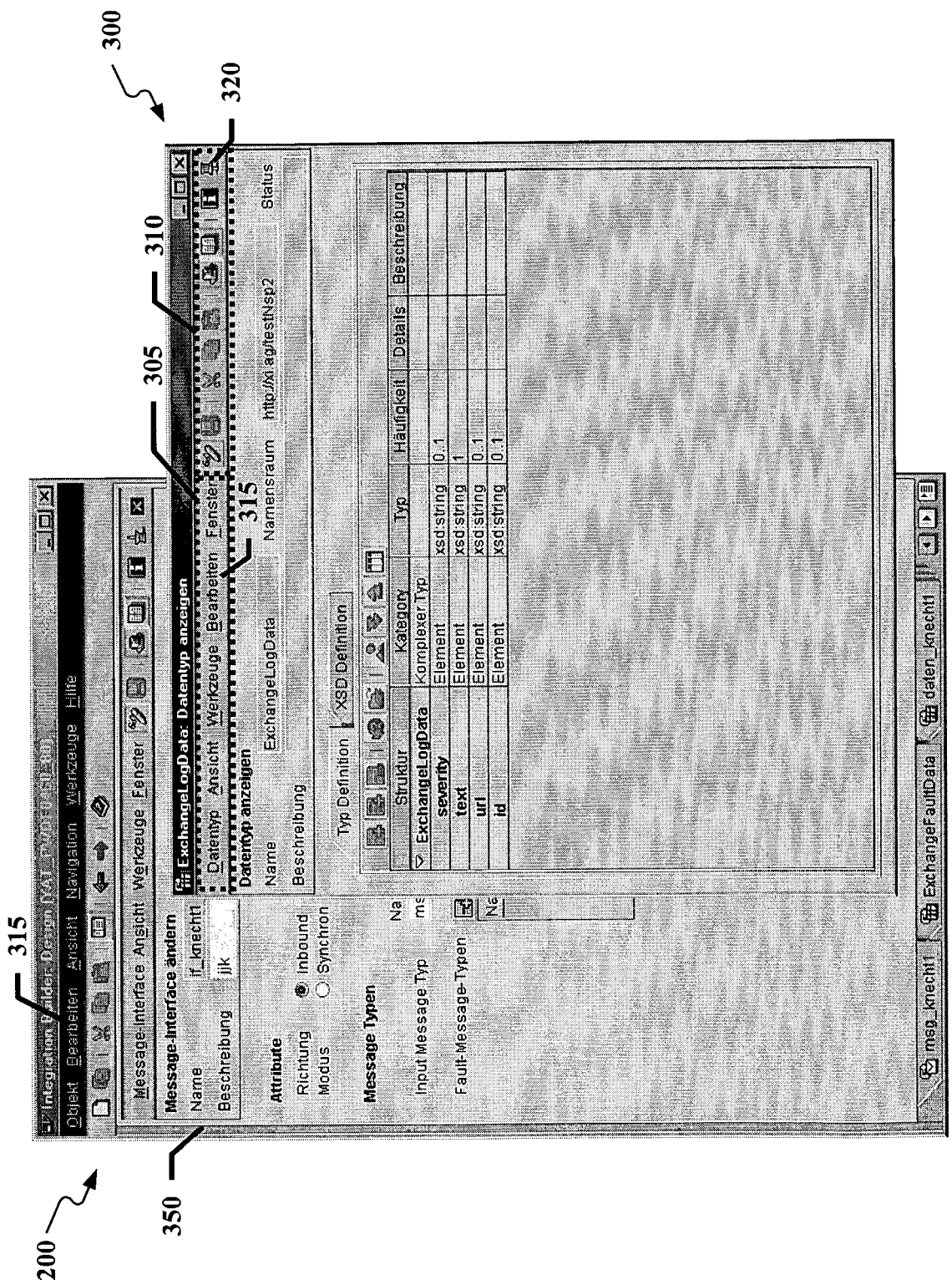
FIG. 3 shows the example multitab-window user interface of FIG. 2 after a tab has been detached.

FIG. 3 shows the example multitab-window user interface of FIG. 2 after a tab has been detached. The tab displayed in FIG. 2 has been detached and transformed into a window 300. The tab-strip control in the first window 200 now shows the previously displayed tab 350 (other portions of the window 200, such as the navigation tree control, are not shown). The new window 300 can be relocated on a display, thus facilitating side-by-side object comparison.

All tabs can have a common default detach location. This default location can be above the tab-strip control in the first window and in proximity to the panel containing the tab-strip control. Thus, detaching a tab from a tab-strip control results in a new window that has the same screen position as the tab-strip control, thereby continuing to obscure the previously viewed tab. Alternatively, the default location can be a defined offset distance from the existing window(s). For example, multiple detach actions can result in a cascade of windows holding the detached tabs.

In addition, a tab can retain window location information after it is reattached to the tab-strip control, such as by selecting an attach button 320, which displays a downward-pointing pushpin. The pushpin pointing down indicates a reattach action for the window 300. For example, a user may detach a tab, move the new window to a new location and resize it for better viewing, then reattach the window as a tab in the tab-strip control. If the user then later detaches the same tab again, the newly generated window appears in the same location and with the same size as the previous window. Thus, the new window appears exactly as the user left the previous window for the same detached tab. Moreover, the up and down pushpins provide a very simple and intuitive interface for detaching and reattaching tabs.

The window 300 can include a menu bar 305 and/or a toolbar 310. The menu bar 305 can collect a tab menu from the source tab and a menu from the main window in a single menu bar in the window 300. The menu from the main window can be an editmenu 315. Thus, the window 300 can be a nonmodal window that provides full application functionality for the object presented in the window 300, even though this functionality may have been split between two separate menu bars when the object was presented in the tab in the tab-strip.

Figure 4:
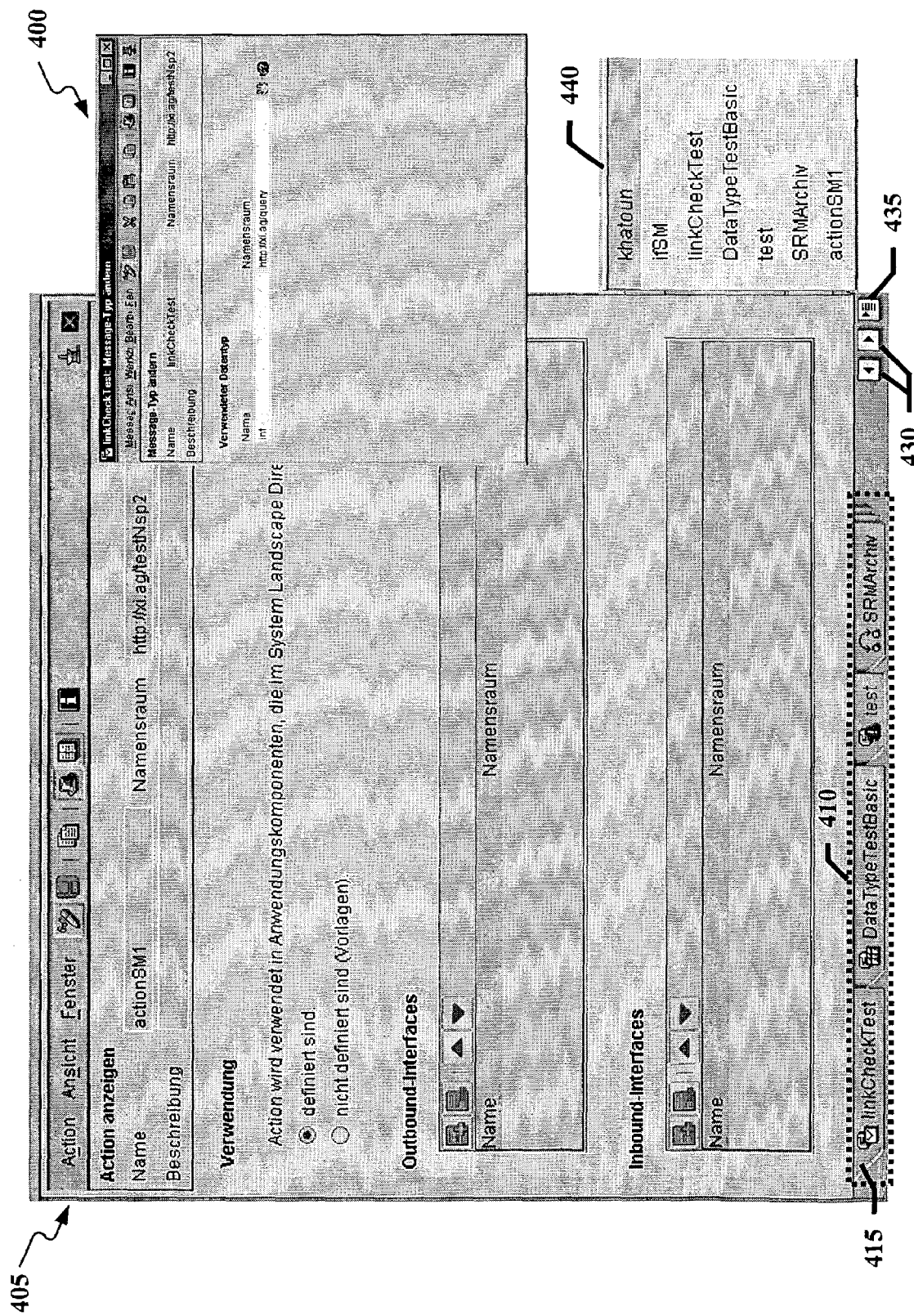
FIG. 4 shows another example multitab-window user interface with detachable tabs.

FIG. 4 shows another example multitab-window user interface with detachable tabs. A window 400 resulting from a detached tab is shown above a tab-strip control 405, which is shown without the rest of its main window. The window 400 has been resized and moved. A tab-strip border 410 includes a tab-head 415 corresponding to the window 400. The tabs can be viewed by selecting tab-heads in the tab-strip border 410. Selecting a tab-head corresponding to an attached tab causes the attached tab to be displayed in the tab-strip control 405. Selecting a tab-head corresponding to a window causes the window to be activated (e.g., brought to the front of the display). Thus, in this example implementation, the windows resulting from detached tabs remain functionally connected with the tab-heads in the tab-strip border. The tab-strip border can be used to activate the windows, thereby eliminating the need to click on the window itself in order to activate it.

The tab-strip control can also include tab arrows 430 and a tab index button 435. These buttons can provide functionality similar to the tab-strip border 410. The tab arrows 430 can be used to cycle through open tabs and windows resulting from detached tabs, or if this functionality is provided by the forward and backward navigation buttons, the tab arrows 430 can be used to cycle through the tab-heads, some of which may be hidden. The tab index button 435 can provide a tab index 440, which is a pop-up menu of all open tabs and windows resulting from detached tabs. The tab index 440 can be used to activate an opened tab or a window resulting from a detached tab. Thus, the user interface provides multiple ways of navigating object information using a tab-strip control, and comparison of object information is facilitated. Moreover, the tab-strip border 410, the tab arrows 430, and/or the tab index button 435 can be detachable from the main panel in the first window, thereby providing a separate floating panel that controls presentation of the tabs and the windows resulting from detached tabs.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

Although only a few embodiments have been described in detail above, other modifications are possible. The logic flows depicted in FIG. 1 do not require the particular order shown, or sequential order, to achieve desirable results.

Other embodiments may be within the scope of the following claims.

What is claimed is:

1. A system comprising:
a windowed environment; and
an application using the windowed environment and employing an application navigation structure comprising a main window that includes:
a main menu,
a navigation tree control to provide access to objects, and
a tab-strip control to present the accessed objects in tabs, the tab-strip control including a tab menu and a detach interface element that causes a tab in the tab-strip control to be visually transformed into a non-modal window when selected, the non-modal window retaining a functional connection with a navigation element in the main window.

2. The system of claim 1, wherein the accessed objects comprise development tool objects, the tabs comprise object editors, the nonmodal window provides an editing interface for an object and includes an attach interface element that causes the nonmodal window to be visually returned to the tab-strip as a tab.

3. The system of claim 2, wherein the nonmodal window includes a menu bar collecting the tab menu for the tab and an edit-menu of the main menu.

4. The system of claim 2, wherein the detach interface element comprises a button displaying an upward-pointing pushpin, and the attach interface element comprises a button displaying a downward-pointing pushpin.

5. The system of claim 1, wherein the navigation element comprises tab-heads, and the functional connection comprises a connection between the tab-heads and the tab detached to the nonmodal window.

6. The system of claim 5, wherein the main window includes a detachable navigation bar comprising tab arrows the tab-heads.

7. The system of claim 1, wherein the nonmodal window is presented in a user-specified location to facilitate side-by-side object comparison when the detach interface element is selected.

8. The system of claim 1, wherein the tab-strip control comprises tab-heads, tab arrows, and a tab-index interface element providing navigation functions among presented tabs including the tabs presented in the main window and the tab detached to the non-modal window.

9. A method comprising:
receiving information corresponding to objects accessed through a user interface;
in response to the received information, presenting tabs with corresponding tab-heads in a tab-strip in a first window, wherein the tab-heads correspond to the received information, the tabs correspond to the accessed objects, and the tabs include a tab menu; and
in response to input designating a tab to detach from the tab-strip, transforming the designated tab into a second window that presents object information previously presented in the designated tab, the second window retaining a functional connection with a navigation element in the first window.

10. The method of claim 9, wherein the objects comprise development tool objects, the tabs comprise object editor tabs, the second window provides an editing interface for an object, the method further comprising:
receiving input editing the object in the second window; and
in response to input indicating reattachment of the second window, transforming the second window into a tab in the tab-strip.

11. The method of claim 10, wherein the designated tab includes the tab menu, and the second window includes a menu bar collecting the tab menu and a menu from the first window.

12. The method of claim 10, wherein presenting tabs and corresponding tab-heads comprises presenting a detach button in connection with the tab-strip to obtain the input designating the tab to detach, the detach button comprising an upward-pointing pushpin, and transforming the designated tab into a second window comprises presenting a reattach button in connection with the second window to obtain the input indicating reattachment, the attach button comprising a downward-pointing pushpin.

13. The method of claim 9, wherein the navigation element comprises a tab-head corresponding to the designated tab, and retaining a functional connection comprises retaining the corresponding tab-head in the tab-strip such that selection of the corresponding tab-head in the tab-strip activates the second window.

14. The method of claim 9, wherein the navigation element comprises forward and back navigation buttons, and retaining a functional connection comprises retaining the second window in a tab navigation history such that selection of the navigation buttons activates the second window.

15. The method of claim 9, wherein transforming the designated tab into a second window comprises presenting the second window above the first window in a user-specified location to facilitate side-by-side object comparison.

16. The method of claim 9, wherein the tab-strip includes the tab-heads, tab arrows, and a tab index interface providing navigation functions among presented object interface elements, including the second window and the tabs presented in the first window.

17. The method of claim 9, wherein receiving information comprises receiving information corresponding to objects opened using a navigation tree control of the user interface, and presenting tabs and corresponding tab-heads comprises presenting the opened objects in the tabs and providing an object editing interface.

18. A system comprising:
a windowed environment; and
an application using the windowed environment and employing an application navigation structure comprising a multi-tab user interface to objects handled by the application, the multi-tab user interface including a tab-strip presenting opened objects in tabs including a detach interface element that causes a tab presenting an opened object to be transferred from the multi-tab user interface to a window in a multi-window user interface, the window including an attach interface element that causes the window presenting the opened object to be transferred from the multi-window user interface to the multi-tab user interface, the multi-window user interface retaining a functional connection with a navigation element in the multi-tab user interface.

19. The system of claim 18, wherein the detach interface element comprises a button displaying an upward-pointing pushpin, and the attach interface element comprises a button displaying a downward-pointing pushpin.

20. The system of claim 19, wherein the tab-strip includes a navigation bar to provide navigation functions among the opened objects in the tabs and the window, and the navigation bar comprises tab-heads, tab arrows, and a tab-index interface element.

21. An article comprising a machine-readable medium storing instructions operable to cause one or more machines to perform operations comprising:
  receiving information corresponding to objects accessed through a user interface;
  in response to the received information, presenting tabs with corresponding tab-heads in a tab-strip in a first window, wherein the tab-heads correspond to the received information, the tabs correspond to the accessed objects, and the tabs include a tab menu; and
  in response to input designating a tab to detach from the tab-strip, transforming the designated tab into a second window that presents object information previously presented in the designated tab, the second window retaining a functional connection to a navigation element in the first window.

22. The article of claim 21, wherein the objects comprise development tool objects, the tabs comprise object editor tabs, the second window provides an editing interface for an object, the operations further comprising:
  receiving input editing the object in the second window; and
  in response to input indicating reattachment of the second window, transforming the second window into a tab in the tab-strip.

23. The article of claim 22, wherein the designated tab includes the tab menu, and the second window includes a menu bar collecting the tab menu and a menu from the first window.

24. The article of claim 22, wherein presenting tabs and corresponding tab-heads comprises presenting a detach button in connection with the tab-strip to obtain the input designating the tab to detach, the detach button comprising an upward-pointing pushpin, and transforming the designated tab into a second window comprises presenting a reattach button in connection with the second window to obtain the input indicating reattachment, the attach button comprising a downward-pointing pushpin.

25. The article of claim 24, wherein the navigation element comprises a tab-head corresponding to the designated tab, and retaining a functional connection comprises retaining the corresponding tab-head in the tab-strip such that selection of the corresponding tab-head in the tab-strip activates the second window.

26. The article of claim 24, wherein the navigation element comprises forward and back navigation buttons, and retaining a functional connection comprises retaining the second window in a tab navigation history such that selection of the navigation buttons activates the second window.

27. The article of claim 21, wherein transforming the designated tab into a second window comprises presenting the second window above the first window in a user-specified location to facilitate side-by-side object comparison.

28. The article of claim 21, wherein the tab-strip includes the tab-heads, tab arrows, and a tab index interface providing navigation functions among presented object interface elements, including the second window and the tabs presented in the first window.

29. The article of claim 21, wherein receiving information comprises receiving information corresponding to objects opened using a navigation tree control of the user interface, and presenting tabs and corresponding tab-heads comprises presenting the opened objects in the tabs and providing an object editing interface.

\* \* \* \* \*